Oct. 7, 1930.                C. DELP                    1,777,401
                    COUPLING FOR PROPELLER SHAFTS
                         Filed April 2, 1928

INVENTOR.
CHRISTOPHER DELP
BY
ATTORNEYS.

Patented Oct. 7, 1930

1,777,401

UNITED STATES PATENT OFFICE

CHRISTOPHER DELP, OF OAKLAND, CALIFORNIA

COUPLING FOR PROPELLER SHAFTS

Application filed April 2, 1928. Serial No. 266,779.

The present invention relates to improvements in couplings for propeller shafts and its particular object is to provide a coupling for the propeller shaft of a motor vehicle that transmits motion from one section of the shaft to a second section in one direction only so as to allow the second section of the shaft to continue revolving when the first section of the shaft is stopped. A coupling of this character allows the motor vehicle to continue to travel according to its momentum when the engine is slowed down or stopped and prevents the engine from exercising braking action on the rear axle. The vehicle is thus allowed to coast when the engine is slowed down suddenly and driving action from the engine begins only after the vehicle is slowed down according to its own laws to the reduced speed of the driving shaft.

It is proposed to provide in combination with a coupling of the character described means whereby the two sections of the shaft may be selectively coupled for transmission of motion in both directions so that the coasting feature may be eliminated at will where the braking action of the engine is desired.

Further objects and advantages of my invention will appear as the specification proceeds.

Figure 1:
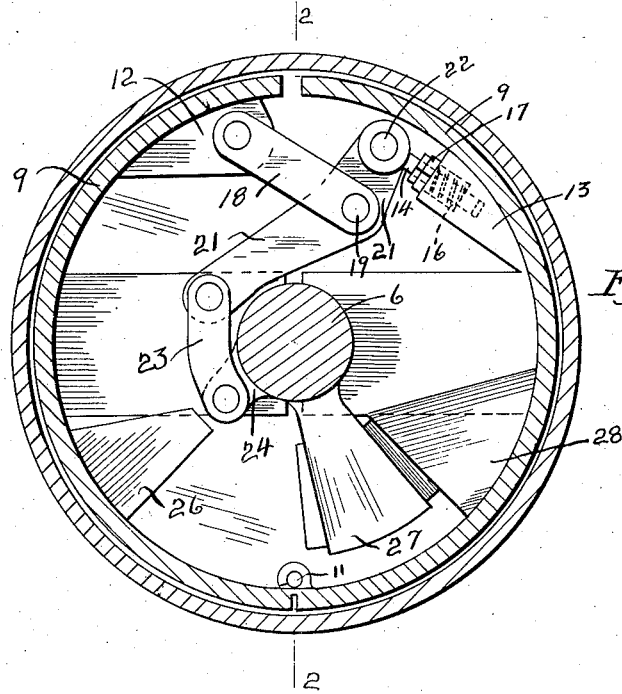
Figure 2:
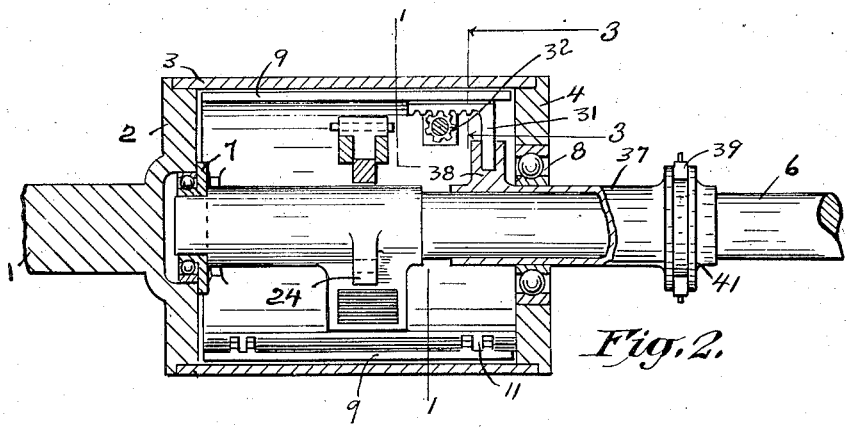
Figure 3:
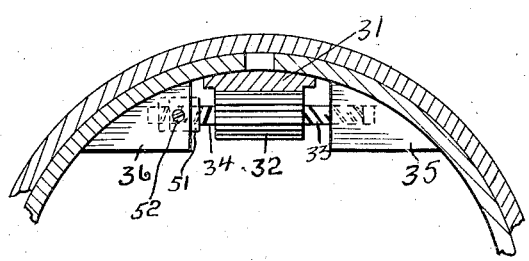

The preferred form of my invention is illustrated in the accompanying drawing in which:

Figure 1 shows a sectional view of my coupling taken on line 1—1 of Figure 2, and Figure 2 is a longitudinal section through the same taken substantially at line 2—2 of Figure 1, and Figure 3 shows a detail section taken along line 3—3 of Figure 2.

While I have shown only the preferred form of the invention, it should be understood that various changes or modifications may be made within the scope of the claims hereto attached without departing from the spirit of the invention.

In the preferred form of my invention, the propeller shaft 1 which may be the driving shaft extending rearwardly from the transmission case in the conventional arrangement of a motor vehicle terminates in an end plate 2 on which a drum 3 is supported with one end thereof for rotation with said shaft while a second plate 4 closes the other end of the drum and rotates therewith. A second shaft 6 extends into the drum in axial alignment with the first shaft and is supported in suitable bearings 7 and 8 in the two end plates of the drum.

Internally of the drum, two friction bands 9 are provided and hinged together as at 11 with two adjacent ends, the friction bands being formed substantially semi-cylindrical and slightly smaller than the drum in such a manner that when spreading action is exercised on the two bands, they will be pressed into intimate contact with the inner face of the drum and cause the drum to revolve with the friction bands. Near the free ends of the two friction bands there are provided two lugs 12 and 13, each of which is fixed relative to its respective friction band. Adjustable means are provided in the latter, said means comprising a threaded member 14 extending into a socket 16 formed in the end of the lug 13, said threaded member being provided with a nut 17 for locking the threaded member in an adjusted position. The two lugs 12 and 13 are disposed on their respective friction bands at substantially the same elevation and a link 18 is pivoted to the lug 12. A lever 21 is pivoted with one end thereof to the free end of the member 14 by means of a pin 22 and is fulcrumed to the link 18 by means of pin 19, while its free end extends across the drum into the confines of the opposite friction band.

It will be readily seen that when the free end of the lever 21 is lifted the two lugs 12 and 13 are forced apart and the two friction bands are forced into contact with the drum for establishing driving relation between the friction bands and the drum. To operate the lever 21, I connect the same by means of a short link 23 to a lug 24 extending from the shaft 6, the arrangement being such, as shown in Figure 1, that the pivot formed between the lug and the link 23, lies below the axis of the shaft 6 and the free end of the lever 21, so that revolving motion of the shaft in a clockwise direction, as wiewed in Figure 1, will have a tendency to force the free end of the lever 21 outwardly, while revolving motion in the opposite direction would tend to draw the lever 21 inwardly. As previously explained, the forcing outwardly of the lever 21 causes the friction bands to engage with the drum so that when the shaft revolves in a clockwise direction the drum will be immediately engaged by the friction bands while when the shaft 6 revolves in a counter clockwise direction the drum is cleared of the friction bands.

With a small load a link of the character thus far described might be sufficient to establish driving relation between the shaft 6 and the friction bands, but for the regular motor vehicle load I prefer to use a direct drive between the shaft 6 and the friction bands, that becomes operative as soon as the friction bands become operative on the drum. This I accomplish by means of a spur 26 extending inwardly from one of the friction bands and a spur 27 connected to the shaft 6 for driving the friction band. The two spurs 27 and 26 are spaced so that they will engage just at the time that the friction bands become fully engaged with the drum.

A similar driving arrangement is provided for operation in the opposite direction and comprises the two spurs 27 and 28, it being understood that the latter spurs become active only when the shaft 6 and the drum 3 are coupled for transmission of motion in both directions.

The latter coupling may be effected by means of the rack 31 and pinion 32. To the pinion 32 are fixed two bolts 33 and 34 with right hand and left hand threads respectively, which co-act with two lugs 35 and 36 which are fixed to the opposite friction bands 9. Thus, when the sleeve 37 is pushed inward, the rack 31 transmits the motion to pinion 32, which causes the lugs to spread apart and force the two friction bands into intimate contact with the drum. The rack 31 may be actuated by means of a sleeve 37 slidable on the shaft 6 and formed with a socket member 38, in which is received the rack 31. The sleeve 37 may be manipulated in any suitable manner, as for instance, by a fork 39 engaging with a grooved collar 41 fixed to the sleeve.

Lug 36 is provided with bushing 51, which has right hand threads. The inside of the bushing is threaded left handed to receive the bolt 34, thus by turning the bushing one way or the other adjustment is obtained between the bands 9. A set screw 52 locks the bushing in place.

The operation of my coupling should be readily understood from the foregoing description. If uni-directional transmission is desired, the link mechanism first described is relied on. It appears that when the shaft 6 is revolved clockwise, the lever 21 will be thrown outwardly whereby the two friction bands are forced apart into driving relation with the drum while at the same time the spur 27 engages with the spur 26 for transmitting motion from the shaft to the friction band directly. When the engine is slowed down suddenly or stopped the shaft 6 throws the free end of the lever 21 inwardly and thereby releases the hold of the friction bands on the drum so as to allow the drum to continue revolving according to its own laws. If it is desired to couple the drum to the shaft for transmission of motion in both directions the sleeve 37 is slid backwardly by means of the fork 39 which causes the two lugs 35 and 36 to spread and to establish driving relation between the friction bands and the drum, while in this case again the spurs 26 and 27 or 28 and 27 are relied upon to transmit motion from the shaft to the friction bands.

Having described my invention, I claim:

1. In a uni-directional coupling, a shaft, a drum concentric therewith, means adapted for driving engagement with the drum and means associated with the shaft operating the said means for effecting driving relation between the former means and the drum only when the shaft turns in a certain direction in combination with means for simultaneously establishing direct driving relation between the two means.

2. In a uni-directional coupling, a shaft, a drum concentric therewith, driving elements mounted for frictional engagement with the drum, and a link mechanism associated with the shaft and the driving elements adapted to render the latter active only when the shaft turns in a certain direction in combination with means for simultaneously establishing direct driving relation between the shaft and the driving elements.

3. In a uni-directional coupling, a shaft, a drum mounted concentric therewith, friction bands mounted within the drum in operative relation to the same and means associated with the shaft for forcing the friction bands into driving relation with the drum when the shaft turns in a certain direction, the said means comprising a lever pivoted to force the friction bands apart when pressed upon and a link connection between the shaft and the lever exerting such pressure when the shaft is rotated.

4. In a uni-directional coupling, a shaft, a drum mounted concentric therewith, two friction bands pivoted at one end inside the drum, a lever having one end pivoted to one of the friction bands near the free end thereof a link having one end pivoted to the other of said friction bands, and pivoted at its free end to said lever intermediate the ends thereof, and a link pivoted to the shaft and engaging the free end of the lever for forcing the same outwardly when the shaft is revolved whereby the friction bands are forced into driving engagement with the drum.

5. In a uni-directional coupling, a shaft, a drum mounted concentric therewith, two friction bands pivoted at one end inside the drum, a lever having one end pivoted to one of the friction bands near the free end thereof, a link having one end pivoted to the other of said friction bands, and pivoted at its free end to said lever intermediate the ends thereof, and a link pivoted to the shaft and engaging the free end of the lever for forcing the same outwardly when the shaft is revolved whereby the friction bands are forced into driving engagement with the drum, the shaft and the friction bands having spurs thereon disposed to assume driving relation at the same time that the friction bands become active on the drum.

6. In a uni-directional coupling, a shaft, a drum concentric therewith, means adapted for driving engagement with the drum and means associated with the shaft operating the said means for effecting driving relation between the former means and the drum only when the shaft turns in one direction, and independent means adapted for selective use for engaging the said first means and the drum for transmitting motion in both directions, and means for simultaneously establishing direct driving relation between the two means.

In testimony whereof I affix my signature.

CHRISTOPHER DELP.